July 17, 1956   W. A. BARNES ET AL   2,754,704
IMPACT WELDING TOOL
Filed March 18, 1953   2 Sheets-Sheet 1

INVENTORS
WILLIAM A. BARNES
DONALD E. BROWN
BY Woodling and Krost
attys

July 17, 1956   W. A. BARNES ET AL   2,754,704
IMPACT WELDING TOOL
Filed March 18, 1953   2 Sheets-Sheet 2

INVENTORS
WILLIAM A. BARNES
DONALD E. BROWN
BY Woodling and Krost
attys

United States Patent Office 2,754,704
Patented July 17, 1956

2,754,704

IMPACT WELDING TOOL

William A. Barnes, Utica, and Donald E. Brown, Clinton, N. Y., assignors to Utica Drop Forge & Tool Corporation, a corporation of New York Application March 18, 1953, Serial No. 343,161

12 Claims. (Cl. 78—82)

This invention relates in general to uniting of metal members by cold pressure uniting or welding of the metal structures under controlled conditions of pressure and confined flow of metal, and relates more specifically to tooling to produce the desired union.

The union of two metallic members by the use of controlled cold flow of the metal structures is relatively recent accomplishment insofar as reducing the basic principles to a practical and usable procedure is concerned. It has long been known that metal can flow at room temperature under proper conditions of loading. It is possible that the uniting, or welding, of two metal objects by controlled application of high pressure at room temperature has been known. However, the reduction of this knowledge to a practical level has only recently been accomplished. United States Patent No. 2,522,408 was granted to Sowter for his development in cold pressure welding.

Even with the further advance in knowledge of basic principles, there has not been provided any practical tool for commercial application of these principles. Knowledge will seldom serve mankind unless made available on a practical level for mass use.

Some metals will actually diffuse in such manner that a polished section of the union will not reveal a distinct junction between the two original members. Other metals have a distinct line dividing the original members. It has not definitely been determined what the nature of the union is in this line. It is definitely established, however, that an exceptionally strong union is produced between the two original members whether or not there is an actual diffusion. It is not the concern of the present invention whether the union is achieved by actual diffusion or some other phenomena of metal union, but rather with the results obtained. Accordingly, in this specification and in the claims, reference will be made to a union between members caused by controlling cold flow of the metal structures, or to a cold weld. It is not intended that this invention should be limited by the choice of words to describe the junction between the members.

Therefore, an object of this invention is to provide a tool for applying controlled impact of dies with respect to one another.

Another object of this invention is to join metal webs by producing a plurality of spots, wherein the metal of the webs is cold pressure welded.

Another object of this invention is to produce the spots by a group of independent die members traveling as a group at high speed toward an anvil.

And another object of this invention is to provide a tool to project a plurality of die members at high speed as a group toward an anvil.

Yet another object of this invention is to provide a carriage for a plurality of die members, which carriage provides momentum and direction to the plurality of die members, and then stops short of the target to allow the die members to each fly free of the carriage and of one another to the target.

Other objects and a fuller understanding of the invention may be had by referring to the following description and claims, taken in conjunction with the accompanying drawings, in which:

Figure 1:
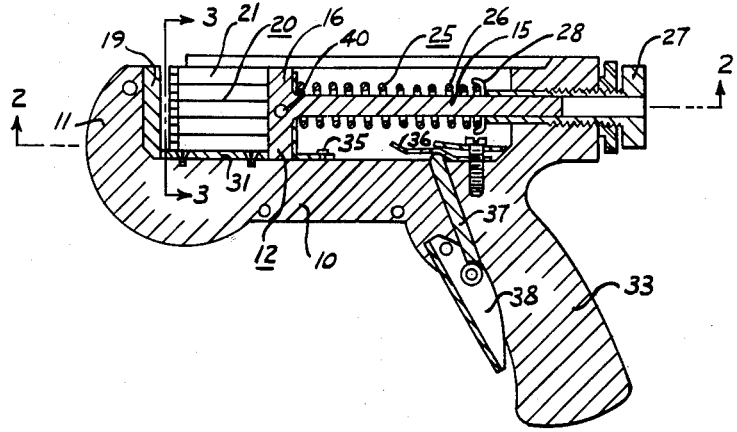
Figure 1 is a longitudinal elevational section view of a hand tool embodying the principles of this invention, taken along line 1—1 of Figure 2.

In the cold pressure type of joining thin sheets of metal, or any type of metallic member, it is necessary to compress the two members and cause a flow of the metal structures. Consequently, in the case of uniting two thin sheets of metal, it is necessary to produce a reduction in the total thickness of the sheets. It is very difficult to obtain a tool which will reduce the thickness the proper percentage. For instance, in the uniting of two pieces of metal foil .004 inch in thickness, the tool would have to compress the foil to an accuracy of plus or minus less than one one-thousandth of an inch. This accuracy is not practicable in any known commercially produced tool.

It has been discovered that this type of welding can be done by impact. Furthermore, it has been found that the use of a single impact die to produce one spot of reduction is not practical for commercial use because a large number of such impressions would be required to join a web of any appreciable width. A single die having a plurality of separate indentation die portions appears to be the logical method of producing a plurality of such impressions. However, it has been found that the single unit die with a plurality of impression points does not give uniform results. It appears that one of the spots, or a few of the spots, will take all of the impact and the balance of the spots will not be properly reduced in section to produce a good cold pressure welded union. It has been discovered that the provision of a series of individual slugs produces a far superior multiple spot cold pressure weld.

However, the use of a multiple number of individual slugs alone does not entirely solve the problem. It was also discovered that the individual slugs must be driven at a high speed by a carriage device, and then released to travel free of any restraint, and strike the target as free flying objects to produce the proper indentation. It was found that the employment of the kinetic energy in each slug as the entire force causing it to do the indentation will produce a good union in every instance, and the indentation can be exactly controlled. In other words, the cradle or carriage which drives each slug should stop free before the slug strikes home, in order that no unevenness of flow can be imparted by the carriage resting more heavily upon one slug than upon another. The weight of each slug must be carefully regulated in proportion to the area of the strike base.

Referring now to the drawings, a practical tool for carrying out the basic concept of providing a plurality of free flying slug members, is illustrated. The illustrated tool is in the form of a hand tool and is built into a frame 10. The frame 10 has an anvil portion 11, and a handle 33. A movable die carriage 12 comprising a ram head 16 and a rod 15 is guided in a fixed path of travel toward and away from the anvil 11 between side plates 14.

An impact impression die means, indicated generally by the reference character 20, is carried by the die carriage 12. As previously indicated, the impression die means 20 may be a solid die member, but preferably is composed of a plurality of individual die members 21 nested together, as illustrated best in Figures 1 and 3, in order that each of the die members 21 may act independently upon the webs inserted between the dies and the anvil 11.

Figure 2:
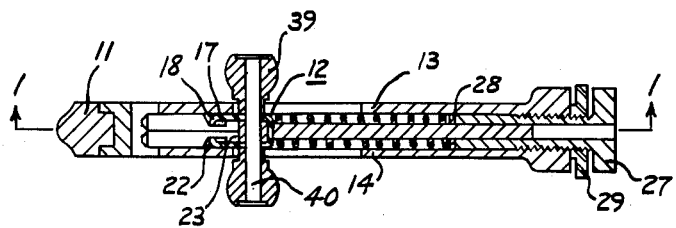
Figure 2 is a sectional view of the tool taken along line 2—2 of Figure 1.

The die members 21 are each provided with a recess 22 as shown in Figure 2. Such indentation provides sidewardly projecting tabs 23. A yoke 17 is carried by the die carriage 12 and provided with finger ends 18 projecting inwardly into the recesses 22 of each of the individual die members 21. The yoke 17 is proportioned with relationship to the die members and recesses so that a degree of looseness exists which will allow the die members to individually move as flying missiles longitudinally with respect to the die carriage 12.

A high speed drive means 25, which comprises a spring 26 in the illustrated embodiment of the invention, is employed to send the die carriage 12 and the dies 21 forward at a high rate of speed. The actual speed and force delivered by the spring 26 to the carriage 12 may be adjusted by means of an adjustable compression member 27 threadably engaged in the rear portion of the frame 10. Member 27 has a cup end 28 thereon into which the end of spring 26 may seat. The member 27 is tubular in order to allow the end of rod 15 to reciprocate in the member 27. The spring 26 encompasses the rod 15, and therefore is held against lateral movement and guided into the cup end 28 of member 27. A lock nut 29 is provided to hold the member 27 in any selected position.

A stop 31 is provided against which the carriage 12 may abut and come to complete stop in a projected position. However, the stop 31 is positioned such that the telescoped dies, in the position illustrated in Figure 2, are short of the anvil. Because of the degree of looseness between the individual die members 21 and the yoke 17, the die members 21 are not brought to a stop along with the carriage 12, but fly free of the carriage and each other as flying missiles and continue forward. The stop means is provided to permit the die members 21 to reach the anvil without causing engagement between the tabs 23 and the fingers 18 of yoke 17. Consequently, there is no drive by the carriage upon the dies at the instant of impact, and the entire impact delivered by each of the die members 21 will depend entirely upon its own mass and inertia at the particular speed at which it is traveling at the moment the carriage is brought to a stop.

Figure 3:
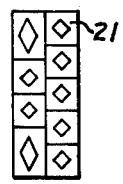
Figure 3 is an end view of the impact dies taken along line 3—3 of Figure 1.

Figure 3 of the drawing is an end view of the nest of individual die members 21. The ends of the individual die members have been shaded in order to avoid an optical illusion which was apparent before the shading. The ends are small rectangular sections of smaller cross-sectional area than the body of the die members. The anvil 11 is provided with a removable die member 19 having a proper configuration to mate with the ends of each of the die members 21.

It is important to understand the nature of the individual die members 21. In Figure 3 the die members are indicated as being of different sizes. Nevertheless, the amount of indentation upon the work pieces is critical and, therefore, must be very closely controlled. The indentation will be the result of the impact force acting over a given area. In order to produce the proper impact area, the actual weight of the individual die members can be controlled by removing excess metal, such as by drilling, in order to reduce the actual mass of a die member. On the other hand, the area of the impact surface can be increased to correspond to the mass of the die member. Usually, however, the size of the die members and the area of their impact surfaces are identical. It is only for unusual purposes that the variety of sizes is necessary.

In the embodiment of the invention illustrated, a catch 35 is carried by the carriage 12, and is adapted to slide under and be engaged by a latch 36. This construction is illustrated in Figure 1 of the drawings. Whenever the carriage 12 is pressed rearwardly against the urge of spring 26, the catch will slip into the latch and hold the carriage and dies in a retracted cocked condition ready to be driven forward at high speed. A trigger 38 and a push rod 37 provides a convenient method to separate the catch and latch and allow the spring 26 to operate.

As best illustrated in Figure 2 of the drawings, a pin 40 extends laterally through the ram head 16 and is provided with two convenient knobs 39. In order to cock the tool, the handle and the head of the adjustable compression member 27 may be placed upon a flat surface and the handles engaged by both hands of the operator and pressed to compress the spring 26. The spring 26 is quite strong and requires considerable compression force to engage the latch and catch 36 and 35.

Figure 4:
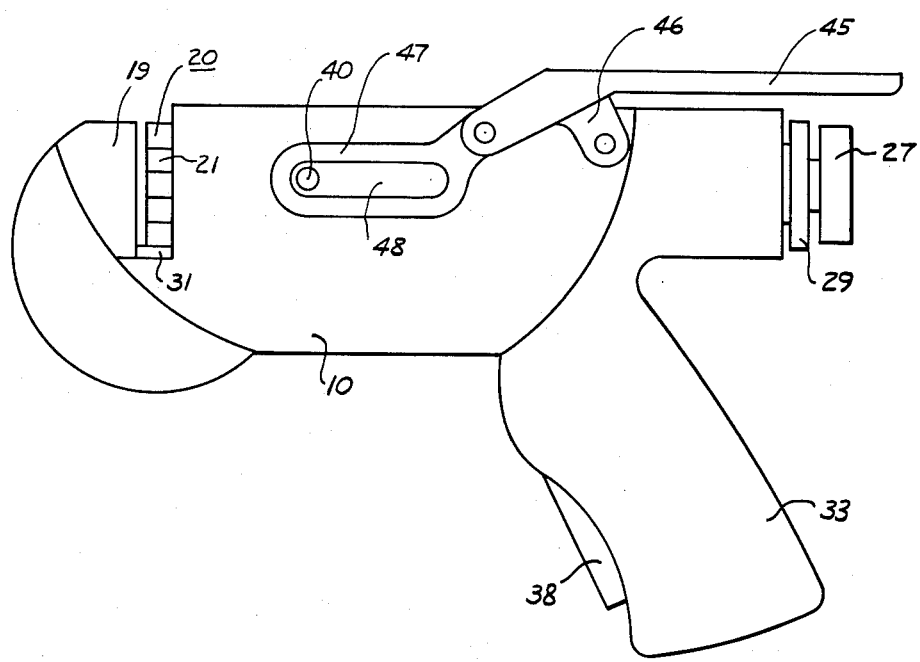
Figure 4 is an elevational view of the tool equipped with a cocking lever device.

In Figure 4 of the drawings there is illustrated a mechanical means for compressing the spring 26. This mechanical means comprises a cocking lever 45 carried by a pivot mount 46 upon the rear portion of the frame 10. A link 47 having a slot 48 therein, engages the pin 40. Preferably the lever 45 extends on both sides of the frame and carries two oppositely disposed link members 47. Therefore, by raising the lever 45 on its pivotal mounting, a considerable mechanical advantage is obtained in order to cock the tool without the necessity of setting the tool upon a bench and forcing the knobs 39 rearwardly as previously discussed.

Although the invention has been described in its preferred form with a certain degree of particularity in order to set forth one embodiment of many possible means for causing the application of a plurality of separate proper impact forces, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An impact welding tool for joining sheets of metal by the cold pressure method, comprising, a frame, said frame having an anvil portion, a movable die carriage, guide means confining said carriage to a fixed path of travel toward and away from said anvil portion of the frame, free flying impact impression die means carried by said movable die carriage, said impression die means extending in front of said die carriage with respect to the direction of travel toward said anvil portion and having a degree of shiftability with respect to the die carriage, high speed drive means adapted to drive the die carriage and the impression die means toward the said anvil portion and thereby also cause relative movement between the carriage and die means, and stop means for said die carriage positioned to stop the movement of the die carriage at a position wherein the carriage and die means are short of the anvil portion, and said die means is power projected to fly forwardly free of said die carriage under kinetic energy to impart an impact welding pressure to said sheets.

2. An impact welding tool for joining sheets of metal by the cold pressure method, comprising, a frame, said frame having an anvil portion, a movable die carriage, guide means confining said carriage to a fixed path of travel toward and away from said anvil portion of the frame, a plurality of impact impression die members carried as a group by said movable die carriage but each acting independently of the other, said impression die members extending in front of said die carriage with respect to the direction of travel toward said anvil portion and having a degree of shiftability with respect to the die carriage, high speed drive means adapted to drive the die carriage and impression die members toward the said anvil portion and thereby also cause relative movement between the carriage and die members, and stop means for said die carriage positioned to suddenly stop the movement of the die carriage at a position wherein the carriage and die members are short of the anvil portion, and the die members are power projected to fly forwardly free of said die carriage under kinetic energy to impart impact welding pressures to said sheets.

3. An impact welding tool for joining sheets of metal by the cold pressure method, comprising, a frame, said frame having an anvil portion, a movable die carriage, guide means confining said carriage to a fixed path of travel toward and away from said anvil portion of the frame, a plurality of impact impression die members nested together as a group and carried by said movable die carriage, said die members being slidable upon one another as longitudinal guide tracks, said impression die members extending in front of said die carriage with respect to the direction of travel toward said anvil portion and having a degree of shiftability with respect to the die carriage, high speed drive means adapted to drive the die carriage and the impression die members toward the said anvil portion and thereby also cause relative movement between the carriage and die members, and stop means for said die carriage positioned to suddenly stop the movement of the die carriage at a position wherein the carriage and die members are short of the anvil portion, and the die members fly forward free of the die carriage under kinetic energy, and each produce a separate blow upon said sheets according to the weight and speed of said die members.

4. An impact welding tool for joining sheets of metal by the cold pressure method, comprising, a frame, said frame having an anvil portion, guide track means defining a path toward said anvil portion, a die carriage mounted to ride said guide track, a sectional impact impression die means carried by said die carriage, the sections of said die means being longitudinally shiftable in the direction of said path independently of one another and extending in front of said die carriage with respect to the direction of travel toward said anvil portion, said die means having a degree of shiftability with respect to the die carriage, spring means urging said die carriage and the impression die means toward said anvil portion, catch means to engage said carriage in a position removed from said anvil, means to move said carriage to the catch position against the urge of said spring means, trigger release means for said catch means, and stop means for said die carriage positioned to suddenly stop the movement of the die carriage at a position wherein the carriage and die means are short of the anvil portion, and the die means travel forward free of the die carriage under momentum imparted thereto by said die carriage and each section produce a separate blow upon said sheets.

5. An impact welding tool for joining sheets of metal by the cold pressure method, comprising, a frame, said frame having an anvil portion, guide track means defining a path toward said anvil portion, a die carriage mounted to ride said guide track, a sectional impact impression die means carried by said die carriage, the sections of said die means being longitudinally shiftable in the direction of said path independently of one another and extending in front of said die carriage with respect to the direction of travel toward said anvil portion, said die means having a degree of shiftability with respect to the die carriage, spring means urging said die carriage and the impression die means toward said anvil portion, catch means to engage said carriage in a position removed from said anvil, side knob members attached to said carriage to provide manual means to move said carriage to the catch position against the urge of said spring means, trigger release means for said catch means, and stop means for said die carriage positioned to stop the die carriage at a position wherein the carriage and die means are short of the anvil portion, and the die means travel forward free of the die carriage under kinetic energy imparted thereto by the momentum of said die carriage and each section produce a separate blow upon said sheets.

6. An impact welding tool for joining sheets of metal by the cold pressure method, comprising, a frame, said frame having an anvil portion, guide track means defining a path toward said anvil portion, a die carriage mounted to ride said guide track, a sectional impact impression die means carried by said die carriage, the sections of said die means being longitudinally shiftable in the direction of said path independently of one another and extending in front of said die carriage with respect to the direction of travel toward said anvil portion, said die means having a degree of shiftability with respect to the die carriage, spring means urging said die carriage and the impression die means toward said anvil portion, catch means to engage said carriage in a position removed from said anvil, cocking lever means pivotally carried by said frame engaging said carriage to provide manual means to move said carriage to the catch position against the urge of said spring means, trigger release means for said catch means, and stop means for said die carriage positioned to stop the die carriage at a position wherein the carriage and die means are short of the anvil portion, whereby the die means may travel forward free of the die carriage and each section produce a separate blow.

7. An impact welding tool for joining sheets of metal by the cold pressure method, comprising, a pistol-grip frame, said frame having a guide track longitudinally thereof, defining a path, an anvil portion extending across said path, a die carriage mounted to ride said guide track, a sectional impact impression die carried by said die carriage, the section of said die means being longitudinally shiftable in the direction of said path independently of one another and extending in front of said die carriage with respect to the direction of travel toward said anvil portion, said die means having a degree of shiftability with respect to the die carriage, a threaded bushing threadably engaged at the rear portion of said frame, a rod carried by said carriage and extending through said bushing, a compression spring around said rod engaging said carriage and said bushing, for urging said die carriage and the impression die means toward said anvil portion, adjustment of the bushing providing adjustment of the drive force of the spring, catch means to engage said carriage in a position removed from said anvil, means to move said carriage to the catch position against the urge of said spring means, trigger release means for said catch means, and stop means for said die carriage positioned to stop the die carriage at a position wherein the carriage and die means are short of the anvil portion, and the die means travel forward free of the die carriage under kinetic energy and each section produce a separate blow upon said sheets.

8. An impact welding tool for joining sheets of metal by the cold pressure method, comprising, a frame, said frame having an anvil portion, a movable die carriage, guide means confining said carriage to a fixed path of travel toward and away from said anvil portion of the frame, impact impression die means carried by said movable die carriage, said impression die means extending in front of said die carriage with respect to the direction of travel toward said anvil portion and having a degree of shiftability with respect to the die carriage, high speed drive means adapted to drive the die carriage and the impression die means toward the said anvil portion and thereby also cause relative movement between the carriage and die means to adjust the intensity of the drive produced, and stop means for said die carriage positioned to stop the die carriage at a position wherein the carriage and die means are short of the anvil portion, and the die means is caused thereby to travel forward free of the die carriage to impart an impact welding pressure to said sheets.

9. An impact welding tool for joining sheets of metal by the cold pressure method, comprising, a frame, said frame having an anvil portion, a movable die carriage, guide means confining said carriage to a fixed path of travel toward and away from said anvil portion of the frame, a plurality of impact impression die members carried as a group by said movable die cariage but each acting independently of the other, said impression die member extending in front of said die carriage with respect to the direction of travel toward said anvil portion and having a degree of shiftability with respect to the die carriage, high speed drive means adapted to drive the die carriage and the impression die members toward the said anvil portion and thereby also cause relative movement between the carriage and die members to adjust the intensity of the drive produced, and stop means for said die cariage positioned to stop the die carriage at a position wherein the carriage and die members are short of the anvil portion, whereby the die members travel forward free of the die carriage, and each produce a separate blow upon said sheets.

10. An impact welding tool for joining sheets of metal by the cold pressure method, comprising, a frame, said frame having an anvil portion, a movable die carriage, guide means confining said carriage to a fixed path of travel toward and away from said anvil portion of the frame, a plurality of impact impression die members nested together as a group and carried by said movable die carriage, said die members being slidable upon one another as longitudinal guide tracks, said impression die members extending in front of said die carriage with respect to the direction of travel toward said anvil portion and having a degree of shiftability with respect to the die carriage, high speed drive means adapted to drive the die carriage and the impression die members toward the said anvil portion and thereby also cause the carriage and die members to adjust the intensity of the drive produced, and stop means for said die carriage positioned to stop the die carriage at a position wherein the carriage and die members are short of the anvil portion, and the die members are caused to travel forward free of the die carriage under the momentum imparted thereto by said carriage, with each die member producing a separate impact blow for welding said sheets together.

11. A welding tool for joining metal work parts by the cold pressure welding method, comprising, a frame, a die carriage movable longitudinally of the frame, stop means on said frame at a position spaced from said work part to abruptly stop longitudinal movement of said carriage relative to said frame at said position spaced from said work parts, impact compresison die means mounted by said carriage and initially spaced from said work parts, said die means being longitudinally projectable independently of said carriage, and high speed drive means adapted to drive said carriage longitudinally of said frame against said stop means with sufficient force whereby sudden stopping of the movement of said carriage by said stop means serves to power project said die means as a missile toward said work parts under kinetic energy independently of said carriage whereby said die means delivers a welding impact to said work parts according to the weight of said die means and the speed imparted thereto by the movement and stopping of said carriage by said stop means.

12. A welding tool for joining metal parts by the cold pressure welding method, comprising, a frame, a power projected die carriage movable longitudinally of the frame and having a retracted position and a projected position spaced from said work parts, stop means on said frame to abruptly stop longitudinal movement of said carriage relative to said frame at said position spaced from said work parts, a plurality of impact impression die sections mounted by said carriage and initially spaced from said work parts, said die sections being projectable longitudinally of said frame independently of said carriage and independently of one another and being retractable longitudinally of said frame with said carriage to said retracted position, interengaging means between each die section and said carriage to cause retraction of said die sections with retraction of said carriage to said retracted position, and high speed drive means adapted to drive said carriage longitudinally of said frame against said stop means with sufficient force whereby sudden stopping of the movement of said carriage by said stop means serves to simultaneously power project said die sections individually as missiles toward said work parts under kinetic energy independently of said carriage and independently of each other whereby each die section delivers a separate welding impact to said work parts according to the weight of each die section and the speed imparted thereto by the movement and sudden stopping of said carriage by said stop means.

References Cited in the file of this patent

UNITED STATES PATENTS

| | | |
|---|---|---|
| 322,930 | Hammond | July 28, 1885 |
| 423,048 | Harvey | Mar. 11, 1890 |
| 848,459 | Grant | Mar. 26, 1907 |
| 1,220,100 | Haeseler | Mar. 20, 1917 |
| 1,319,696 | Davidson | Oct. 28, 1919 |
| 2,096,002 | Moreira et al. | Oct. 19, 1937 |
| 2,101,159 | Stevens | Dec. 7, 1937 |
| 2,263,595 | Sinko | Nov. 25, 1941 |
| 2,338,869 | Porter | Jan. 11, 1944 |
| 2,358,885 | Sullivan | Sept. 26, 1944 |
| 2,511,506 | Hruby | June 13, 1950 |
| 2,639,634 | Sowter | May 26, 1953 |